Figure 1:
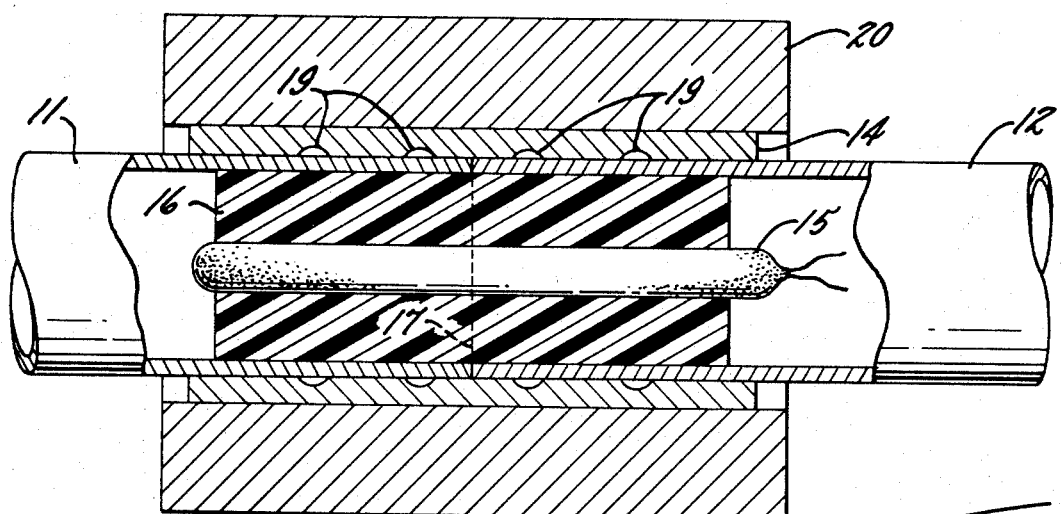

United States Patent [19]
Daniels et al.

[11] 3,710,434
[45] Jan. 16, 1973

[54] EXPLOSIVE PIPE COUPLING METHOD

[75] Inventors: Neville H. G. Daniels, Los Altos; Edward S. Wright, Los Altos Hills, both of Calif.

[73] Assignee: Anken Chemical & Film Corporation, Newton, N.J.

[22] Filed: March 6, 1970

[21] Appl. No.: 17,173

[52] U.S. Cl. ............... 29/470.1, 29/479, 29/523
[51] Int. Cl. ............................................ B23k 21/00
[58] Field of Search ......... 29/421 E, 470.1, 486, 479, 29/523

[56] References Cited

UNITED STATES PATENTS

| | | | |
|---|---|---|---|
| 2,779,279 | 1/1957 | Maiwurm | 29/421 X |
| 3,290,771 | 12/1966 | Silverman et al. | 29/421 |
| 3,364,561 | 1/1968 | Barrington | 29/470.1 |
| 3,364,562 | 1/1968 | Armstrong | 29/470.1 |
| 3,377,694 | 4/1968 | Simons et al. | 29/470.1 |
| 3,409,969 | 11/1968 | Simons et al. | 29/470.1 X |
| 3,434,194 | 3/1969 | Whittaker et al. | 29/470.1 X |
| 3,503,110 | 3/1970 | Berry et al. | 29/470.1 X |
| 3,535,767 | 10/1970 | Doherty, Jr. et al | 29/470.1 |
| 3,206,845 | 9/1965 | Crump | 29/523 UX |
| 3,411,198 | 11/1968 | Bermon et al. | 29/523 X |
| 3,428,338 | 2/1969 | Corwin | 29/523 X |
| 3,432,916 | 3/1969 | Fisher et al. | 29/523 X |

FOREIGN PATENTS OR APPLICATIONS

| | | | |
|---|---|---|---|
| 766,741 | 12/1954 | Great Britain | 29/421 |

*Primary Examiner*—J. Spencer Overholser
*Assistant Examiner*—Ronald J. Shore
*Attorney*—Wolfe, Hubbard, Leydig, Voit & Osann, Ltd.

[57] ABSTRACT

Pipes or other tubular members are explosively joined. An internal smooth walled tube is placed within an outer tube or sleeve having one or more circumferential internal grooves; an explosive charge centered within a shock force transmitting core is positioned within the inner tube, and a smooth-walled tubular die is positioned outside the sleeve. By exploding the charge and transmitting force radially outward, the inner tube is caused to expand radially and circumferentially into a permanent conforming contact with the outer tube or sleeve and its internal groove or groves.

9 Claims, 2 Drawing Figures

PATENTED JAN 16 1973　　　　　　　　　　　　　　　3,710,434

INVENTORS.
NEVILLE H. G. DANIELS
EDWARD WRIGHT
BY
Wolfe, Hubbard, Leydig, Voit & Osann
ATTORNEYS.

EXPLOSIVE PIPE COUPLING METHOD

INTRODUCTION

This invention relates to the explosive joining of pipes or other tubular members, and more particularly concerns a method of joining tubular members which is characterized by the production of a tubing joint having unusually high strength.

The use of explosive techniques to join pipes and the like is now well established. Ordinarily, two tubes which are to be joined are partially telescoped into each other, or else placed in an abutting relation and surrounded with an external sleeve. Detonation of an internal or external explosive charge causes deformation of the tubes and/or sleeves, forming a joint that is permanent, leakproof, ordinarily quite strong, and made rapidly and at low cost. Feastures of the techniques include the ability to join dissimilar metals and to minimize the adverse effects of welding, or of cold or hot working that may be produced in some metals by other tube joining techniques.

Various explosive joining techniques have been described in the literature, as for example in Silverman et al. U.S. Pat. No. 3,290,770, U.S. Pat. No. 3,290,771, and U.S. Pat. No. 3,343,248, and Horeth British Pat. No. 776,741. While these are representative of modern explosive joining systems, the joints so produced have tensile strengths much less than the tensile strength of nonjointed tubing.

An object of the present invention is to provide an explosive joining method in which the joint has tensile and compressive strength approaching that of the tubing itself.

Another object is to provide a method for explosively forming tubes which provide a joint capable of withstanding high hydraulic pressures without leaking.

Another object is to provide a method for explosively joining pipe which provides a sealed joint without the use of coatings or gaskets, and relying on metal-to-metal contact of the tubes.

Another object is to provide such a method whereby strong joints are made with minimal preparation of the tubing, and in fact which may be employed with dirty tubing.

Still a further object is to provide a tube joining system in which the external anvils or dies exhibit reduced damage or distortion during continued use.

Figure 2:
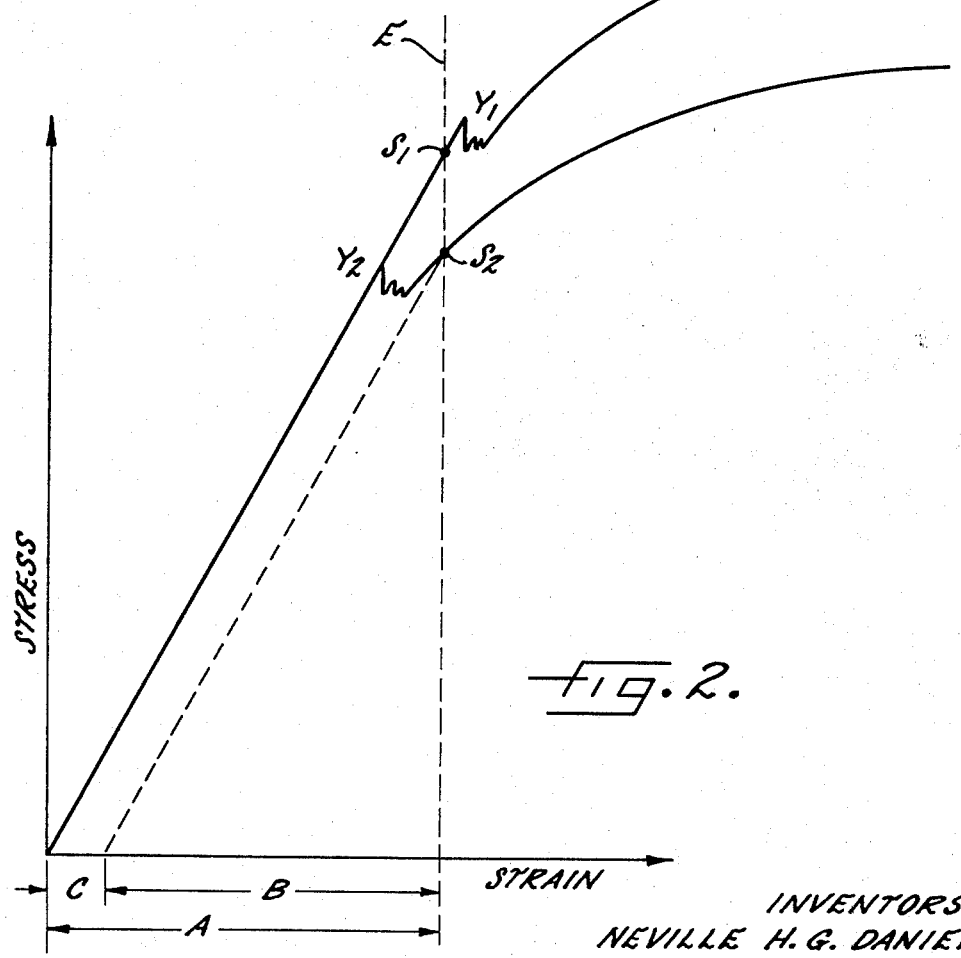

Other and further objects will become apparent as the description of the invention proceeds in conjunction with the annexed drawings, which:

FIG. 1 schematically depicts, in sectional view, an explosive assembly for carrying out the method of the invention; and FIG. 2 displays illustrative stress-strain curves of a sleeve and tube.

Turning now to FIG. 1, the invention is illustrated in an embodiment wherein it is desired to join a pair of tubes 11, 12 of generally similar cross section, that is, substantially equal inner and outer diameters. The tubes 11, 12 are to be explosively secured to an outer tube or sleeve 14.

In keeping with the invention, an elongated explosive nucleus 15 is centrally disposed along the axis of the tubular members or tubes 11, 12. The explosive in the nucleus 15 may be any of the chemical explosives customarily used for explosive welding, compaction, joining, and/or perforation, and are typified by PETN (pentaerythritol tetranitrate), or other high explosives as described in Kirk-Othmer, "Encyclopedia of Chemical Technology", Second Edition, Volume 8, page 581.

Surrounding the explosive nucleus and in radial proximity to the tube 11 is a radial force transmitting core 16, which is made of a substantially incompressible material transmitting explosive shock from the nucleus 15 to the tubes 11, 12. Advantageously, the core 16 is composed of a deformable solid material such as gelatin, rubber, a synthetic organic elastomer, petroleum wax, grease, or the like. Alternatively, the core 16 may be a liquid core of water, oil, or the like (which may, if desirable, be contained by or within a suitable impermeable membrane), to transmit radial explosive shock force from the nucleus 15 to the tube walls. Although the explosive detonation will ordinarily decompose many of the materials preferred for the core 16, it may be desirable to employ a material such as gelatin, which is water soluble, and hence may be washed out of the joined tubes after explosive forming.

The tubes 11, 12 to be joined are, in the present embodiment, of essentially the same inner and outer diameter. Their abutting ends 17 preferably are ground or machined square so that the resulting joint has as smooth an internal surface as possible.

A particularly advantageous feature of the invention is that it may be used with any of a variety of metals, and in turn these may be uncoated or coated with a protective layer of another metal or of a resinous substance. Although it is usually desirable to remove this protective layer, at least on the outside of the tubes 11, 12, before joining, this is by no means necessary, and in fact coated or even dirty tubes 11, 12 may be joined satisfactorily. It has been found that the high strength and good sealing properties of the joints are not dependent on the presence of such coatings of resinous substances or layers of metal, and that joints with exceedingly high resistance to separation and resistance to hydraulic leakage are obtained where no coatings or gasket-like elements are used, and where metal-to-metal contact is utilized.

An external sleeve 14 is positioned around and in proximity to the inner tubes 11, 12 and advantageously extends equally from the ends 17. A series of circumferential grooves 19 is machined or ground on the internal surface of the sleeve 14, and it is into these grooves 19 that the adjacent wall sections of the tubes 11, 12 are forced when the explosive nucleus 15 is detonated.

The sleeve 14 fits as snugly as possible over the tubes 11, 12, although in practice clearances of 0.005–0.010 in. or more may be used. The length of the sleeve is usually from about two to about four times the outer diameter of the tubes 11, while the thinkness is approximately twice that of the tube walls. Optimally, the grooves 19 are free from sharp corners or edges, and their width is several times greater (generally but not exclusively 3–12) than their depth.

A die 20 surrounds the sleeve 14 over the entire length of the sleeve, and optionally a short distance beyond the sleeve in either direction. This die 20 desirably is made of a hard material such as tool steel, is composed of a number of segments held together elastically, as for example by wrapping with a rubber bandage, and should be fairly heavy so as to provide an anvil-like backing to resist outward expansion of the sleeve 14. An advantage of the invention, however, is that the die 20 may be made of low cost metal such as hot rolled steel. The purpose of the die 20 is to present a slightly yielding surface to the explosively expanding tubes 11, 12 and sleeve 14, and to absorb excess impulse of the explosion as momentum of the separating die segments. Accordingly a simple rubber bandage around the segments provides this function and, in addition, permits easy disassembly of the die 20 after the explosive forming operation. Alternatively, light steel straps, about one-half inch wide by 0.020 inch thick, held together at the ends with a No. 6 screw and nut, may be used; in this case, the screw is broken and the strap laid back to liberate the segments after explosion.

As indicated on the drawing, both the inner and outer walls of tubes 11, 12 are commercially smooth, and the outher surface of the sleeve and the inner surface of the die 20 are also commercially smooth. Thus, in keeping with the invention, the external wall of the sleeve 14 is deformed only slightly during explosive joining, and its deformation being maintained at a minimum by virtue of the surrounding die 20.

After the explosive nucleus 15, shock force transmitting core 16, inner tubes 11, 12, outer sleeve 14 and die 20 has been assembled, the forming of the joint can then take place by detonating the explosive nucleus. When this occurs a radially expanding shock force is transmitted outward to the tubes 11, 12. As a result of the shock force, expansion is produced in those areas of the tubes 11, 12 which are not opposite the grooves 19 in the sleeve 14, to contact the inner surface of the sleeve 14.

As to those areas of the tubes 11, 12 which are directly opposite the grooves 19, these unsupported areas are embossed into the grooves 19 by the shock force.

Because, in the typical case, the tubes 11, 12 and the surrounding sleeve 14 are unable by themselves to resist further radial and circumferential expansion caused by the explosion, the surrounding die 20 then begins to function, This die, both by reason of its inertial mass and its preferably elastic mounting, resist further expansion of the sleeve 14.

It will be appreciated that under the influence of the explosive shock, the metal of the tubes 11, 12 and of the sleeve 14 can deform plastically once their respectively yield points are exceeded. It can be readily shown that, because of geometrical considerations, the tubes undergo a greater percentage strain than does the sleeve for any given amount of expansion of the assembly by the explosive force. It this occurs that the tubes can undergo considerably more plastic strain than the sleeve, since it would be theoretically possible to choose an amount of expansion such that the sleeve would deform only in an elastic manner, but that the tubes would deform both plastically and elastically. Since only the elastic portion of the deformation is recovered after relief of the explosive force, the sleeve tends to recover a greater proportion of its total deformation than do the tubes. However, the complete recovery (elastic contraction) of the sleeve is resisted by the plastically expanded tubes so that after relief of the explosive force the sleeve is in a state of circumferential tension, the tubes are in a state of circumferential compression, and a high compressive radial force exists between the sleeve and tubes. The effective sealing characteristics of joints made by the method of the invention against high hydraulic pressure is believed to be attributable to the differential recovery of the sleeve and tube after the joint formation shock wave.

The magnitude of the radial compressive force between the tubes and the sleeve depends upon many factors including the wall thicknessess and diameters of the tubes and sleeve, the amount of expansion of these parts during formation of the joint, and the elastic moduli, yield strength and work hardening characteristics of the parts. If the yield strength of the sleeve is higher than that of the tubes, the sleeve can sustain a proportionately greater amount of elastic strain without yielding, and can therefore exert a greater compressive force on the tubes and thereby affect a stronger or more tightly sealed joint. Conversely, if the strength of the sleeve is substantially less than that of tubes, the tubes recover a greater proportion of their total strain than does the sleeve and a satisfactory joint is not produced. Similar effects can be achieved by using tubes and sleeves of differing elastic moduli. It has been discovered that joints having exceptional mechanical strength will be produced when the sleeve 14 is made of metal having a higher yield point than that of the tubes 11, 12 (about 1.25 or higher), and the magnitude of the explosive shock force is such as to momentarily stress the metal of the tubes beyond its yield point to cause plastic flow. By the foregoing we mean that plastic flow is produced not only in the metal of the tubes 11, 12 directly opposite the grooves in the sleeve 14 so as to cause plastic flow into the grooves in the sleeve to produce close conformity of the tube metal against the outer groove walls, but also plastic flow in those sections of the tubes radially adjacent the explosive assembly and where the shock force transmitting material is positioned to transmit shock force to the tubes without substantial attenuation.

To explain the above described phenomenon, reference is made to FIG. 2, which displays illustrative stress-strain curves for metals of a sleeve 14 and tubes 11, 12. The vertical line E represents the strain produced in the materials in the formation of a joint by an explosive shock force. It will be observed that in the example of FIG. 2 the sleeve 14 has been stressed to a point $S_1$ below its yield point $Y_1$, and within the region of elastic strain. Furthermore, the tubes 11, 12 have been stressed to the point $S_2$ beyond their yield point $Y_2$ into the region of plastic flow and have been deformed plastically to the extent represented by the arrow C. Accordingly, after the shock wave has passed, the sleeve 14 tends to fully recover the deformation represented by the arrow A, while the tubes 11, 12 can only partially recover their deformation to the extent represented by the arrow B. Since the sleeve 14 tends to recover its full deformation while the tubes 11, 12 can only partially recover their deformation, the sleeve places the tubes in circumferential compression while the sleeve remains in circumferential tension.

This phenomenon is similar to that which occurs in a process known as "autofrettage" employed to improve the endurance of gun barrels, pressure vessels, and the like, and is believed to explain many of the unusually high strengths of of explosive-formed joints according to the invention. While not intended to be bound by any theory, analysis of the residual stresses in joints formed according to the invention show that the sleeves are under residual tension stresses while the tubes are under residual compression stresses. Thus the stressing of the tubes beyond the yield point without over stressing the sleeve metal has apparently produced this condition of residual stresses, and in addition has produced a strong mechanical lock between the parts due to the expansion of the tube metal into the grooves in the sleeve.

It has not been established, nor does it appear to be essential, that the explosion creates sufficient expansion of the sleeve 14 to exceed its yield strength also. The surrounding die 20 serves to confine the sleeve even in the event its yield strength is exceeded. However, on theoretical grounds, it appears necessary for optimum realization of the benefits of the invention to exceed the yield strength of the tubes 11, 12.

In practice the sleeve may in some instances with advantage be stressed beyond its elastic range if design limitation of the application permit this to be done. The same principles as described above will apply, for although the sleeve will not now recover its full deformation, the tubes will still recover a lesser portion of their deformation. Consequently the sleeve will once again place the tubes in circumferential compression while it remains in tension.

Furthermore, it has been found that joints made with this method will hold a hydraulic seal at high pressure levels even after the joint has been subjected to longitudinal stresses sufficient to produce slippage of the joint and the start of mechanical failure.

With respect to the grooves 19, it appears that a flattened, groove, with rounded edges, is the most desirable shape. Should the radius of the rounded ends of the groove, however, be excessively large, decreased tensile strength of the tube joint can be expected. On the other hand, should the grooves 19 to be excessively deep, rupture of the adjacent tube 11, 12 walls may occur.

Although the invention has thus far been described in conjunction with the joining of two lengths of tubing having essentially equal cross sectional dimensions, it is evident, of course, that the invention has more diverse application. Thus, for example it may be used to join lengths of tubing wherein one tube telescopes into the other; in this embodiment, the outer tube is circumferentially grooved in a manner similar to the grooves 19 of the sleeve 14, and an explosive core expands the inner tube into engagement with the outer. By this procedure, strong joints are effected between tubes of differing sizes.

Additionally, pipe caps or vessel heads may be secured to the tubular portion of the pipe or vessel respectively the the procedure of the invention. The cap or head may either be the inner or outer tubular member, in either event with the inner member explosively expanded outwardly and into sealing contact with the outer member.

The invention will further be exemplified in the ensuing Examples, which are representative and illustrative, but are intended neither to be exclusive nor fully definitive of the scope thereof. Obviously, many alternatives, variations, and modifications of the invention will become apparent from the Examples, and it is intended to embrace all such alternatives, variations, and modifications as fall within the spirit and broad scope of the appended claims.

EXAMPLES

Various aspects of the invention are illustrated in the ensuing Examples.

In each instance, unless otherwise stated, an explosively formed tube joint is made from two lengths of 4 ½ inch O.D. by 0.117 inch wall thickness steel Line Pipe, using an external sleeve of 5 inches O.D. by 0.225 inch wall. Unless otherwise specified, the sleeve is made of a higher strength steel, about 12 inches long, with four internal grooves with their center lines located at 3 inches, 4 ¾ inches, 7 ¼ inches, and 9 inches from one end of the sleeve.

Again unless otherwise stated, the explosive is contained within a core of gelatin, shaped as a monolithic cylinder with a length of 10 inches and an outer diameter of about 5 inches.

The surrounding die is made of steel, and is cylindrical both inside and outside. The die weighs about 40 pounds, and is composed of four longitudinal segments, each 12 inches long, secured together by a thin steel strap about 0.5 inches wide by about 0.020 inches thick. The inner diameter of the surrounding die is 5 inches.

After explosively forming the tube joints, any explosive or core residues are removed, and end plugs welded into each end of the joined tube. Unless otherwise indicated, hydraulic pressure is internally applied to the joined tube while the ends of the tube are placed in tension. Observations are made on the tube while it is simultaneously undergoing internal hydraulic pressure and a longitudinal tensile stress, and the maximum load in tension (including both tension load applied by the test machine and tension load due to the internal pressure) is noted when the joint separates.

In the several Examples, each "Shot" is numbered in the sequence in which it was actually run. Thus, preceding shot comments should be noted to trace cumulative procedural variation where applicable.

EXAMPLE I

This Example compares the explosive joining system of the present invention (Shot No. 7) with tow prior art explosive joining procedures. In Shot No. 9, both the tubes and the sleeve are un-grooved; in Shot No. 8, a different die is used with four grooves, each 1 inch wide by 0.125 inches deep with a 0.31 inch radius at both sides of the groove, formed in the surrounding die face, circumferentially of the inner face of the die. This die is not further used in the Examples.

EXAMPLE I

| Shot No. | Groove details | | | Hydraulic test, p.s.i. | Max. load in tension, lb. | Unit stress in pipe, p.s.i. | Comments |
|---|---|---|---|---|---|---|---|
| | Width | Depth | Radius | | | | |
| 9 | No groove in die or sleeve | | | 500 Leak | 10,000 | 6,100 | Fired in 12 in. long die with 10 in. of low density tetryl pellets. |
| 8 | 4 grooves in die, no grooves in sleeve | | | 1,170 OK | 31,900 | 19,600 | Joint slipped and internal pressure dropped too fast to maintain by pumping. |
| 7 | 1.0 | 0.125 | 0.31 | 1,170 OK | 101,900 | 62,500 | Joint fired in longer 12 in. die with longer (10 in.) length of low density tetryl pellets, to obtain improved filling of first groove, ¾ in. slippage before leak. |

EXAMPLE II

This Example illustrates tube joint strength as a function of the yield strength of the sleeve; in other words, tube joint strength as a function of the relative yield strengths of the internal tubes or pipes and the external sleeves.

EXAMPLE II

| Shot number | Groove details | | | Hydraulic test, p.s.i. | Max load in tension, lb. | Unit stress in pipe, p.s.i. | Comments |
|---|---|---|---|---|---|---|---|
| | Width | Depth | Radius | | | | |
| 5 | 1.0 | 0.125 | 0.31 | Leaked at 200 | 44,400 | 27,200 | Sleeve made of stress relieved 1010 steel. Low yield strength, sleeve material not preferred. |
| 13 | 1.0 | 0.125 | 0.31 | 1,170 OK | 89,000 | 54,700 | Sleeve material given process anneal. Demonstrates X-52 sleeve material effective even when not cold worked. Pulled out ¾ in. without leak under 1,170 p.s.i. 12 in. long die. |
| 3 | 1.0 | 0.125 | 0.31 | 1,170 OK | 85,400 | 52,400 | Groove radius as for shot 2, but groove length extended to 1 in. by flat section between radii. Joint slipped 1 in. without leak. 10 in. long die. |
| 11 | 1.0 | 0.125 | 0.31 | 1,170 OK | 86,000 | 52,700 | New X-52 sleeve material. Other shot details as No. 7. Sleeve material used as received. 96-98 Rp. 12 in. long die. |
| 6 | 1.0 | 0.125 | 0.31 | 1,170 OK | 101,900 | 62,500 | Sleeve made of 4135, about Rc 33. High yield strength sleeve material preferred. 10 in. long die. |

EXAMPLE III

This Example illustrates joint strength as a function of groove dimensions.

EXAMPLE III

| Shot number | Groove details | | | Hydraulic test, p.s.i. | Max load in tension, lb. | Unit stress in pipe, p.s.i. | Comments |
|---|---|---|---|---|---|---|---|
| | Width | Depth | Radius | | | | |
| 1 | 1.0 | 0.125 | 1.06 | 1,170 OK | 61,900 | 38,000 | Circular section groove. Joint slipped without leaking. |
| 3 | 1.0 | 0.125 | 0.31 | 1,170 OK | 85,400 | 52,400 | Groove radius as for shot 2, but groove length extended to 1 in. by flat section between radii. Joint slipped 1 in. without leak. |
| 2 | 0.5 | 0.125 | 0.31 | 1,170 OK | 83,900 | 51,400 | Circular section groove. Joint slipped without leaking. |
| 4 | 0.35 | 0.125 | 0.19 | 1,170 OK | 81,900 | 50,200 | Circular section groove. Joint slipped without leak. |

EXAMPLE IV

This Example illustrates the method of the invention as applied to clean tubes and sleeves (Shot No. 11) and a joint made with the sleeve bore and the pipe external surface deliberately covered with mud before firing (Shot No. 12).

EXAMPLE IV

| Shot number | Groove details | | | Hydraulic test, p.s.i. | Max load in tension, lb. | Unit stress in pipe, p.s.i. | Comments |
|---|---|---|---|---|---|---|---|
| | Width | Depth | Radius | | | | |
| 11 | 1.0 | 0.125 | 0.31 | 1,170 OK | 86,000 | 52,700 | New X-52 sleeve material. Other shot details as No. 7. Sleeve material used as received. 96-98 R$_B$. |
| 12 | 1.0 | 0.125 | 0.31 | 1,170 OK | 84,500 | 51,800 | Sleeve bore and pipe deliberately covered with mud before assembly. Other shot details as No. 10. Demonstrates joint does not demand cleanliness. |

EXAMPLE V

In this Example, a tube joint is made according to the procedure of Shot No. 3, and is subjected to hydraulic pressure until rupture.

The pressure was increased to 5250 pounds, until a leak developed at a pinhole failure in the weld at the plugged end of one of the tubes. Extensive bulging was noted; the pipe bulged to about 5.33 inches O.D., from an initial 4.50 inches. Maximum internal pressure of 5250 psi compares with the nominal bursting strength of this pipe of 3307 psi.

EXAMPLE VI

In this Example, the system of the invention (Run A) is contrasted with prior art explosive tube technique (Run B and Run C). It should be noted that the results are not strictly comparable by reason of the different sleeve dimensions and firing details.

In each of the B and C runs, 2 inch, schedule 40, 0.154 inch wall tubing was joined by a seamless cold drawn tubing sleeve, 8 inches long. The surrounding die was a doubles die, with the inner face grooved circumferentially with semi-circular grooves approximately one-half inch wide by one-eighth inch deep, four grooves per joint. The die was composed of four longitudinal segments held together by several wraps of adhesive tape.

In Run A, according to the invention, the tubing was 2 ½ inch O.D. by 0.250 inch wall thickness, with four internal machined grooves, approximately one-half inch wide by one-eighth inch deep with rounded fillets. (For this run, the surrounding die had no grooves.) The explosive was 12 grams of PETN in a thin Lucite tube 6 inches long by approximately one-half inch in diameter, positioned within a gelatin core about 6 inches long and 2 inches O.D.

After firing, the tube was cleaned and its ends welded shut. Hydraulic testing at 2000 psi and simultaneous longitudinal tension were applied. The joint began to slip at 58,000 pounds tension plus 2000 psi internal pressure. No leaking was noted as the joint slipped.

In Run B, the sleeve was composed of 2 ⅞ inch O.D. cold drawn seamless tubing, 0.25 inch wall by 8 inches long. The charge of 12 grams PETN in a thin brass tube (2 grams/in.) was centered in a gelatin plug 6 inches long. After firing, the joined tubing was cleaned, end plugs were welded in, and the assembly was subjected to hydraulic testing. No leakage was detected at 2000 psi, but when the tubing was subjected to longitudinal tension the joint began to slip at 8500 pounds tension but did not leak at 100 psi internal pressure. Examination of the joint indicated inadequate forming, as compared with the good joint formation of Run A.

For Run C, cold drawn seamless tubing, 2 ⅝ inch O.D., 0.120 inch wall thickness, by 8 inches long sleeve was used. The explosive was 14 grams PETN (2.3 gms./in.) in a thin Lucite tube centered in a gelatin core. After cleaning and application of end plugs, the jointed tube as subjected to hydraulic testing; no leakage was detected at 2000 psi. When longitudinal tension was applied simultaneously, the joint began to slip at 23,000 pounds tension. No leakage occurred as the joint slipped. Examination of the joint indicated that it was well formed.

Thus, it is apparent that there has been provided, according to the invention, a system for explosive joining pipes or other tubular members which fully satisfies the aims, objectives, and advantages as set forth above.

EXAMPLE VII

This example illustrates the application of the method of the invention to the joining of aluminum alloy tubing. In this example, an explosively formed tube joint is made from two lengths of 4 ½ inch O.D. by 0.125 inch wall thickness drawn aluminum tubing of 6061-T6 aluminum alloy, using an external sleeve 5 inches O.D. by 0.250 wall. The sleeve is made of extruded 6061-T6 aluminum alloy tubing, about 12 inches long, with four internal grooves with their center lines located at 3 inches, 4 ¾ inches, 7 ¼ inches, and 9 inches from one end of the sleeve.

The arrangement of the explosive charge, and the die used are essentially as described for the making of joints in steel line pipe of 4 ½ O.D.

EXAMPLE VII

| Shot number | Groove details | | | Hydraulic test, p.s.i. | Max. load in tension, lb. | Unit stress in pipe, p.s.i. | Comments |
| --- | --- | --- | --- | --- | --- | --- | --- |
| | Width | Depth | Radius | | | | |
| 18 | 1.0 | 0.125 | 0.31 | 900 OK | 54,800 | 31,900 | Leak developed after ½ in. of movement. |

The following is claimed as invention:

1. In a method of explosively joining inner and outer tubular members by internal explosive shock force, the improvement comprising:
   assembling, in radial proximity,
   a. an inner, effectively smooth walled, tubular metal member,
   b. an outer tubular metal member having at least one circumferential internal groove.
   c. an explosive charge surrounded by a plug of shock force transmitting material within said inner tubular member and with said material in contact with said inner tubular member, and
   d. an effectively smooth walled, expansible tubular die surrounding said outer tubular member; and
   detonating said explosive charge and transmitting shock force produced thereby radially through said force transmitting material to the inner tubular member of such magnitude to radially expand and plastically deform said inner member beyond its yield point and cause plastic flow of the inner member metal where surrounded by said outer member into permanent conforming contact with the outer tubular member and to form said inner member into said internal groove, while simultaneously radially expanding and only elastically deforming said outer member by radially expanding said member and radially expanding said expansion die to deform said outer member approaching but not exceeding its yield point, and allowing said outer member to substantially recover its elastic deformation to produce residual circumferential compressive stresses in said inner tubular member and residual circumferential tension stresses in said outer tubular member, the combination of the radial compressive forces exerted by the outer member on the inner member due to elastic recovery of the outer member and the formation of the inner member into the groove providing a fluid tight as well as axially strong mechanical joint.

2. Method of claim 1 wherein said outer tubular member is made of metal having a higher yield point than the metal of the inner tubular member.

3. Method of claim 1 wherein said shock force transmitting material is an incompressible deformable solid core.

4. Method of claim 1 wherein said shock force transmitting material is a liquid.

5. Method of claim 1 wherein said outer tubular member is about twice the thickness of said inner tubular member, and said internal groove is about as deep as the thickness of said inner tubular member.

6. Method of claim 1 wherein said expansible tubular die is a segmented metal die.

7. Method of claim 1 wherein said expansible tubular die is sufficiently heavy to absorb excess impulse of the explosion as momentum of the die segments.

8. Method of claim 1 including first and second inner tubular members of similar cross sectional dimensions in abutting relationship, and wherein said outer tubular member has at least one circumferential groove over each of said inner tubular members.

9. In a method of joining inner and outer tubular members, the improvement comprising:
   assembling, in radial proximity,
   a. an inner, effectively smooth walled, tubular metal member,
   b. an outer tubular metal member having at least one circumferential internal groove, said outer tubular member being made of metal having a higher yield point than the metal of the inner member, and,
   c. an effectively smooth walled, expansible, tubular die, surrounding said outer tubular members; and,
   producing residual circumferential compressive stresses in said inner tubular member and residual circumferential tension stresses in said outer tubular member by radially expanding and plastically deforming said inner tubular member beyond its yield point to cause plastic flow thereof where surrounded by said outer member into permanently conforming contact with the outer tubular member including said internal groove while simultaneously radially expanding an only elastically deforming said outer member by radially expanding said member and radially expanding said expansion die to deform said outer member approaching but not exceeding its yield point by the application to said inner tubular member of an internal radially transmitted shock force, and allowing said outer member to substantially recover its elastic deformation and exert compressive forces on such inner member, the combination of the radial compressive forces exerted by the outer member on the inner member due to the elastic recovery of the outer member and the formation of the inner member into the groove providing a fluid tight as well as axially strong mechanical joint.

* * * * *